United States Patent [19]

Shaw

[11] 4,103,794
[45] Aug. 1, 1978

[54] BALE MOVER

[75] Inventor: Robert Shaw, Killarney, Canada

[73] Assignee: B & K Industries Ltd., Killarney, Canada

[21] Appl. No.: 700,748

[22] Filed: Jun. 29, 1976

[30] Foreign Application Priority Data

Feb. 20, 1976 [GB] United Kingdom ............ 06801/76

[51] Int. Cl.$^2$ ............................................ B60P 1/38
[52] U.S. Cl. .................. 214/518; 214/91 R; 214/DIG. 4
[58] Field of Search ......... 214/518, 78, 6 B, DIG. 4, 214/DIG. 5, 77 R, 79, 80, 131 R, 130 B, 130 C, 83.14, 91 R, 89, 147 G, 520, 519; 198/755, 817

[56] References Cited

U.S. PATENT DOCUMENTS

| | | | |
|---|---|---|---|
| 1,628,871 | 5/1927 | Bruce | 214/83.14 |
| 2,084,460 | 6/1937 | Snow | 214/91 |
| 2,311,577 | 2/1943 | Rose | 198/459 |
| 2,620,935 | 12/1952 | Christiansen | 214/147 G |
| 3,260,380 | 7/1966 | Skromme et al. | 214/6 B |
| 3,877,595 | 4/1975 | Edelman | 214/DIG. 4 |
| 3,942,666 | 3/1976 | Pfremmer | 214/518 |

*Primary Examiner*—Drayton E. Hoffman
*Assistant Examiner*—Lawrence E. Williams

*Attorney, Agent, or Firm*—Stanley G. Ade

[57] ABSTRACT

A wheel mounted chassis is provided with a pair of spaced and parallel conveyor chains extending longitudinally from the front to the rear of the chassis. A pair of cylindrical bale, pick-up arms are pivoted forwardly of the chassis and are adapted to be engaged with each end of a bale to be picked up. Fluid operator means pivot the arms and the bale through an arc and deposit the bale onto the conveyor chains. The arms then return to the forward position to pick up the next bale. As the arms move rearwardly through an arc, means are operatively connected to the conveyor chains to move the upper runs thereof rearwardly a predetermined amount and stop clutch or ratchet means prevent forward movement of the upper runs of the conveyor chains when the arms move forwardly. The first bale is thus moved rearwardly as the next bale is picked up and deposited and this continues until the chassis is full or enough bales are loaded thereon. A stop device at the rear of the chassis retains the bales until it is desired to dump them whereupon the stop device is lowered and the arms are actuated thus moving the bales rearwardly until they roll off the rear end of the chassis. A hitch enables the chassis to be pulled by a tractor or the like which supplies the power for the fluid operator.

25 Claims, 13 Drawing Figures

BALE MOVER

BACKGROUND OF THE INVENTION

This invention relates to new and useful improvements in bale carriers, particularly bale carriers designed to lift and transport the relatively heavy cylindrical bales now being formed by present day baling devices.

These bales are extremely heavy and awkward to manipulate so that it is desirable to provide a device which will facilitate the lifting and transportation and ultimate unloading of these bales.

SUMMARY OF THE INVENTION

The present device consists of a wheeled frame adapted to be pulled by a tractor. A pair of forwardly extending lift arms are provided which engage the side of the bale whereupon fluid operator means lift the arms over in an arc carrying the bale with it and deposit the bale on a pair of endless conveyor chains extending in spaced and parallel relationship to the back of the chassis or frame. Linkage is provided which operatively connects the arms to a ratchet or stop clutch device which in turn is operatively connected to the two chains so that each time the arms move from the forward position to the rearward position, the upper runs of the chains are moved rearwardly carrying any bales therewith.

The present device is adapted to carry four such bales and an embodiment is shown which is adapted to carry eight bales in two rows of four. Under these circumstances a swing hitch is provided so that the tractor can pull the device from either side thus facilitating the loading of the bales on either of the two sets of chains. However it will be appreciated that the device can be designed to carry more or less bales depending upon design parameters.

The device is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
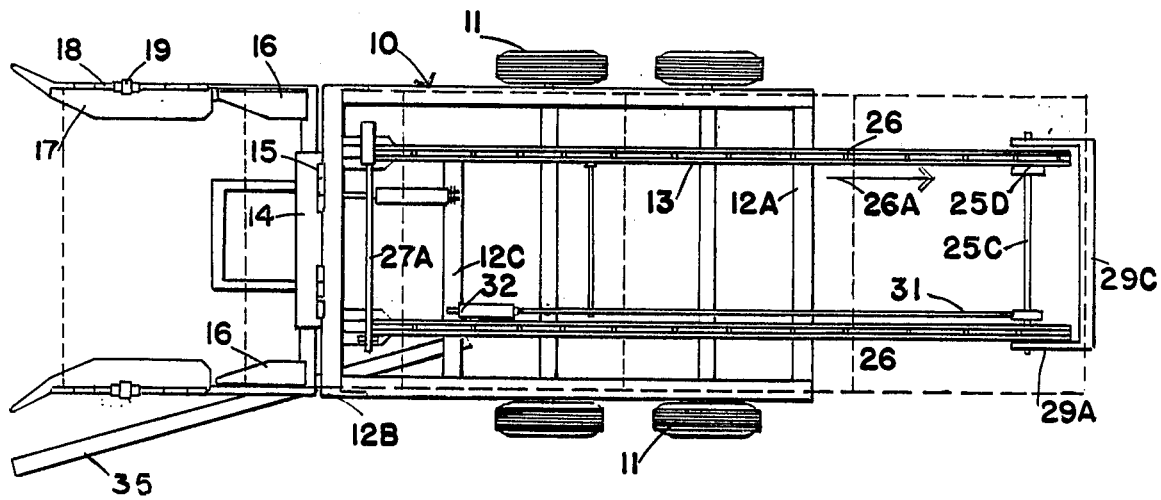
FIG. 1 is a top plan view of the device showing the four bale embodiment.

Proceeding therefore to describe the invention in detail, and dealing first with the embodiment shown in FIG. 1, a substantially rectangular chassis 10 is provided mounted upon ground engaging wheels 11 in the usual way.

Cross bars 12A and 12B support a pair of spaced and parallel chain carrying chassis members 13 which are situated just inboard of the main chassis members 10 and extend rearwardly of this chassis as clearly illustrated.

Figure 2:
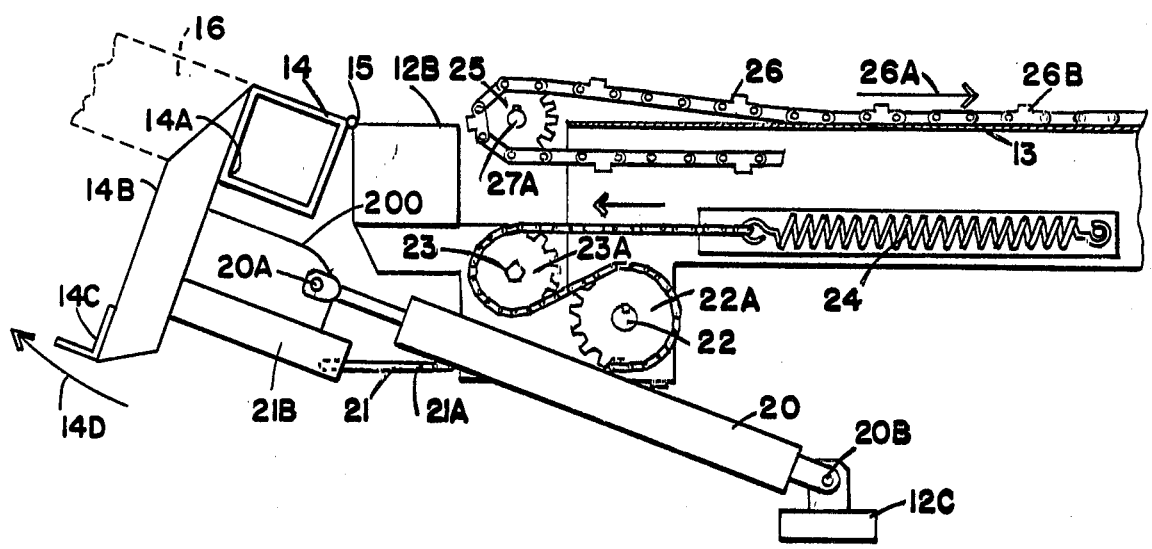
FIG. 2 is a fragmentary side elevation showing the actuation of the lifting arms and the drive mechanism.

A hinged pick-up assembly 14 is shown in FIGS. 1 and 2 and is hinged to cross member 12B by means of hinges 15. This includes a hollow cross member 14A and a lift frame 14B extending downwardly therefrom, terminating in a cross member angle iron 14C to assist in lifting the bale as will hereinafter be described.

Secured to and extending forwardly from each end of the cross member 14A is a pair of lift arms 16 having flipper plates 17 hinged to the forward ends of these arms by means of hinges 18, and including a stop 19 to limit the upward swinging movement of the plates 17. These arms have been deleted from FIGS. 2 and 3 for clarity.

Figure 4:
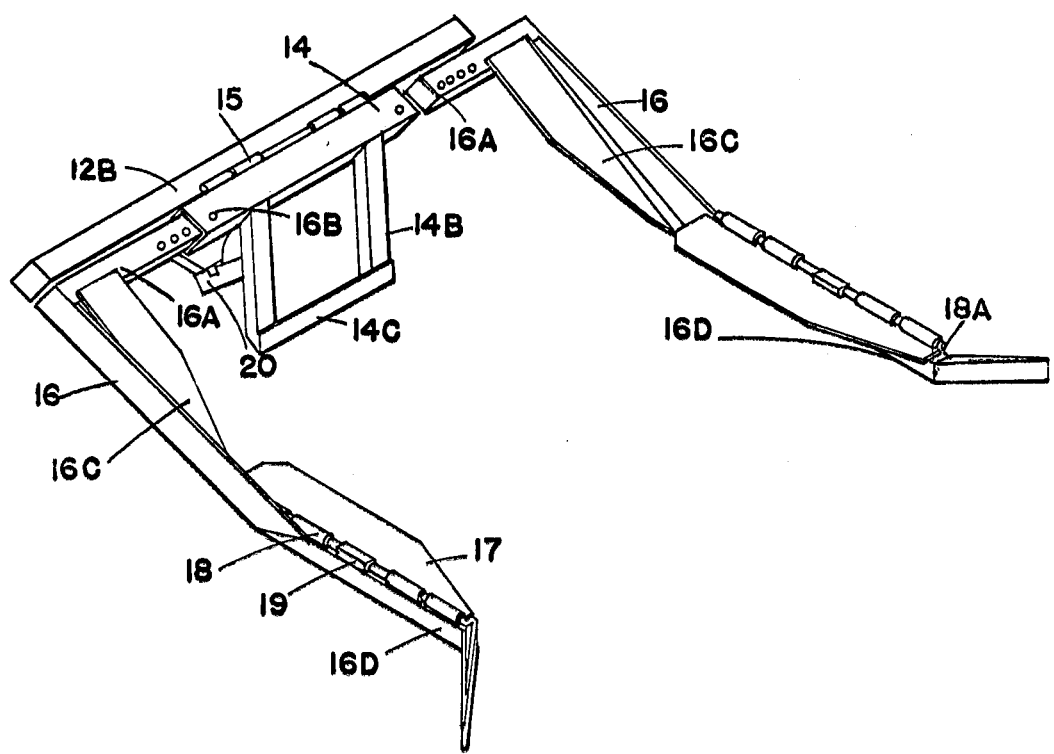
FIG. 4 is a fragmentary isometric view of the lift arm assembly per se.

Reference to FIG. 4 will show that the arms 16 are adjustable in width by the provision of mounting portions 16A slidably engaging within cross beam or member 14A and being held in the desired position by means of pins 16B. One of the arms 16 is shown displaced from the cross member 14A for clarity.

It will also be noted from FIG. 4 that inner portions 16C of the arms extend forwardly substantially at right angles from the outer ends of portion 16A and that outer portions 16D are secured to and extend forwardly from the distal ends of the portions 16C, but at an angle thereto.

Hinges 18 are mounted towards the outer edges 18A of the portions 16D so that the flipper plates 17 extend inwardly substantially horizontally with respect to FIG. 4 and are prevented from further downward movement because the inner portions of the flipper plates are resting upon the upper horizontal surfaces of the portions 16D. Stops 19, secured to the outer edge of plates 17, limit the upward travel of the flipper plates 17 when a bale is disengaging, as will hereinafter be described, thus ensuring that the flipper plates will return to the position shown in FIG. 4, by gravity, ready to receive the next bale.

A fluid operator in the form of a piston and cylinder assembly 20 extends between a cross member 12C (extending between chassis members 13) and a lug 20C situated on the rear side of the assembly 14, below hinge 15, pivot pins 20A and 20B mounting the hydraulic piston and cylinder assembly to lug 20C and cross member 12C respectively as clearly illustrated.

A link 21 is pivotally connected by one end thereof to an attaching member 21B extending rearwardly from assembly 14 just below pivot point 20A and a chain 21A is connected by one end thereof to the other end of link 21. A shaft 22 is bearingly mounted across the chassis and carries a sprocket 22A keyed thereto and chain 21A extends around this sprocket, around idler sprocket 23A freely mounted on shaft 23 also across the chassis, and terminates with a connection to a tension spring 24 anchored to the chassis as shown in FIG. 2. This tension spring maintains tension on chain 21A as the chain is actuated by the movement of the assembly 14 through the agency of the fluid operator 20.

Figure 3:
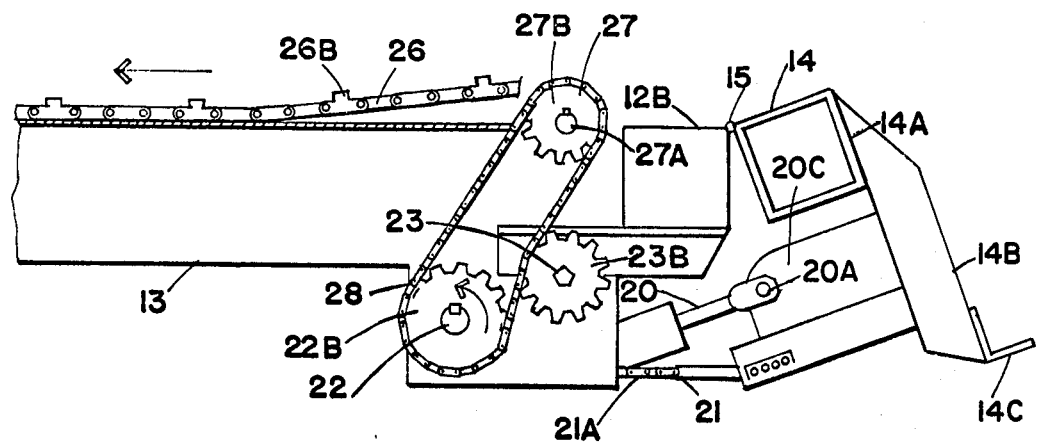
FIG. 3 is a view similar to FIG. 2 but taken from the other side thereof.

Reference should next be made to FIG. 3 in which shaft 22 is provided with a further keyed sprocket 22B mounted thereon, with an endless drive chain 28 extending around the sprocket, around an idler sprocket 23B, and around a sprocket 27 keyed to a main cross shaft 27A. This shaft 27A is supported within bearing blocks 27B supported at the front of each chassis member 13 and just rearwardly of cross member 12B.

Sprocket 27 incorporates a ratchet or stop clutch assembly which is conventional and shaft 27A also mounts the main chain sprockets 25, keyed thereto one upon each side thereof, with endless chains 26 extending around the sprockets with one run of each of the chains above each respective chassis member 13 and the lower run of each chain extending through each respective chassis member 13. These chains extend the full length of the chassis members 13 and extend around rear sprockets 25A (see FIG. 7), the tension being adjusted by conventional chain tighteners 25B. These sprockets 25A are supported on a cross shaft 25C supported within bearing blocks 25D secured to the rear ends of chassis members 13 (see FIGS. 1 and 7).

Figure 5:
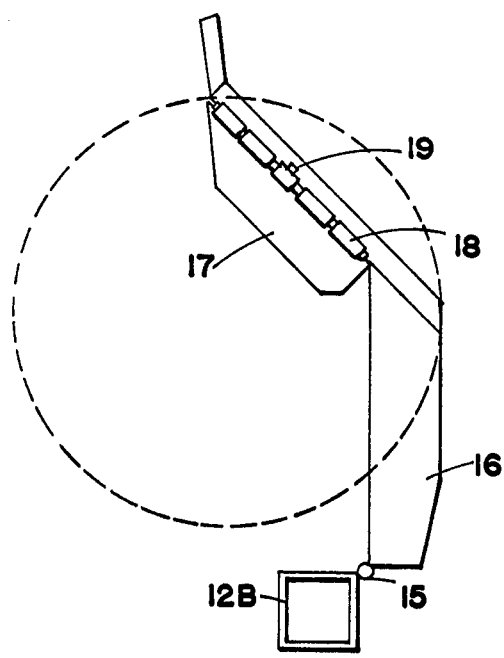
FIG. 5 is a schematic side elevation of the lift arm assembly in the uppermost position.

The operation in general consists of driving the device forwardly by means of a tractor 36 (shown schematically in FIG. 8) so that the flipper plates 17 (which are horizontal) slice into the sides of the associated cylindrical bale approximately 1 foot above the ground and until the rounded surface of the bale engages the angle iron 14C. The fluid operator 20 is then actuated moving the assembly 14 in the direction of arrow 14D shown in FIG. 2, to the position shown in FIG. 5, lifting the bale (shown in phantom) between the pick-up arms 16 assisted by angle iron 14C. As the angle of the arms reaches approximately 115° from the horizontal, the weight of the bale will cause it to roll rearwardly onto the upper runs of the chains 26, disengaging from the flipper plates 17 which rotate upwardly to permit the disengagement. The arms are then lowered ready to pick up the next bale, with the flipper plates moving back to the horizontal position by gravity, and as the arms are once again raised, the upper runs of the chains 26 are moved in the direction of arrow 26A due to chain 21A and the ratchet stop clutch assembly 27. This moves the first bale rearwardly thus permitting room for the second bale to be deposited upon the chains. This action is repeated until four bales (in this particular embodiment) are mounted upon the chains whereupon the device may be moved to a desired location for discharging the bales. Actuation of the arms as hereinbefore described causes the upper runs of the chains to move rearwardly each time the arms are raised so that the bales are deposited rearwardly of the chassis one at a time.

Figure 6:
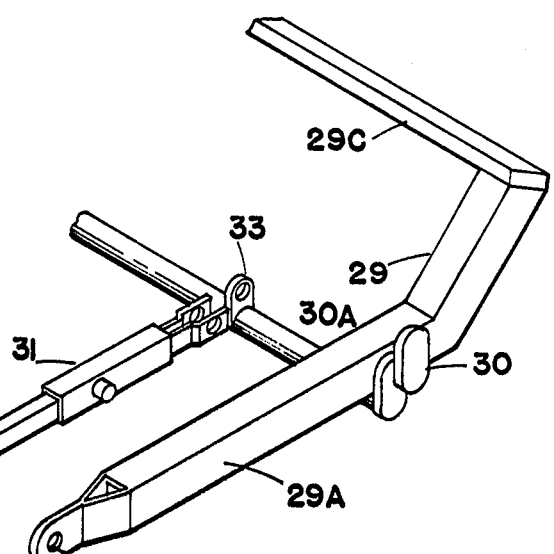
FIG. 6 is a fragmentary isometric view of the rear stop mechanism.
Figure 7:
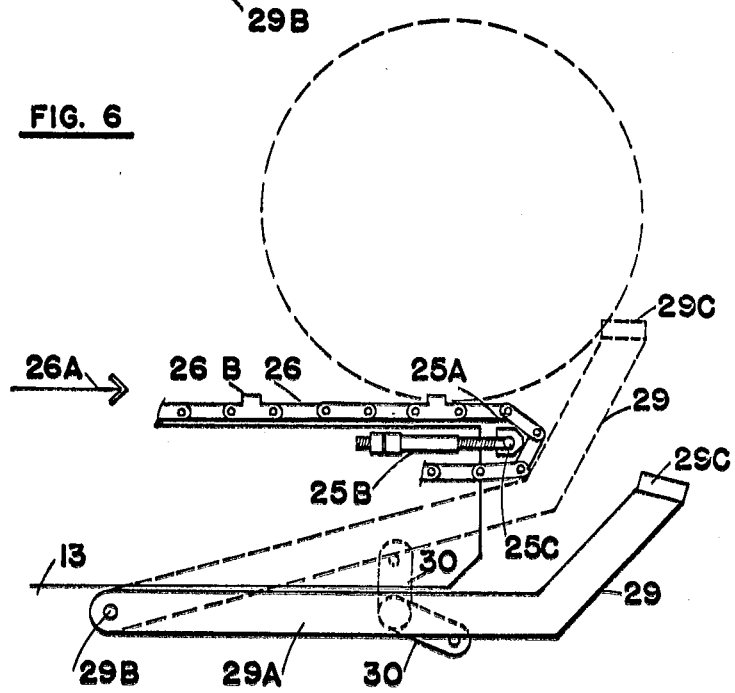
FIG. 7 is a fragmentary side elevation of the rear stop mechanism.

It is necessary to prevent inadvertent disengagement of the rearmost bale from the rear of the chassis, during transportation and in this connection, reference should be made to FIGS. 6 and 7 which show a stop assembly 29 including a pair of arms 29A pivoted to the rear of the chassis by means of pivot points 29B and including a cross arm 29C extending between upward extensions of these arms 29 at the rear ends thereof.

An offset crank or cam 30 is provided upon each end of a shaft 30A journalled for rotation within the chassis member 13 and an actuating arm 31 is pivoted to a lug 33 on shaft 30A and extends forwardly to a fluid operator 32 which is mounted on the chassis.

When the offset lugs 30 are in the position shown in FIG. 6, the cross bar 29C acts as a stop across the rear end of the chassis member 13 and prevents the rearmost bale from rolling from the chassis. However, when the fluid operator 32 is actuated, the arms 29 together with cross bar 29C are moved to the lowermost position as shown in solid line in FIG. 7 due to the movement of the offset lugs 30 thus permitting the bales to be discharged rearwardly of the chassis.

Figure 8:
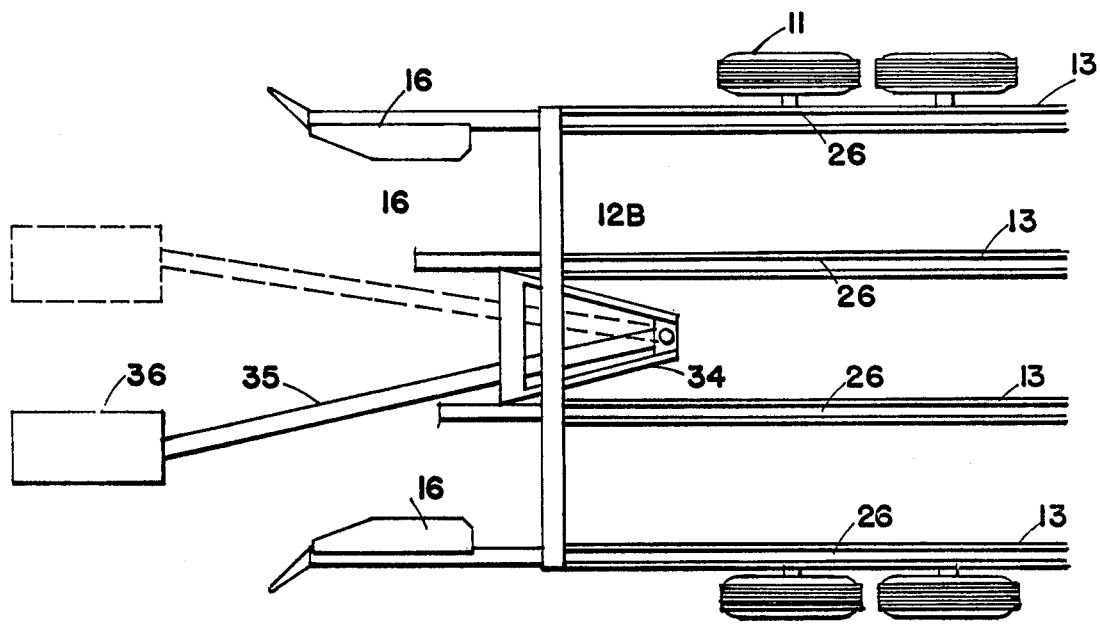
FIG. 8 is a partially schematic top plan view of an alternative embodiment adapted to carry two rows of four cylindrical bales and showing details of the swing hitch.

FIG. 8 shows a double set of chassis members 13, with two sets of arms 16 extending forwardly therefrom and under those circumstances, it is desirable to be able to pull the chassis from either side. In this connection, a swing hitch bar or tongue 35 is provided extending through a yoke assembly 34 situated between the two sets of conveyor chains 26. This bar 35 may be pivoted to the position shown in solid line in FIG. 8 to a position shown in phantom in FIG. 8 and vice versa thus allowing the tractor 36 to pull the chassis from either side so that bales can be loaded on the conveyor chains 26 opposite to the side from which the tractor is pulling the assembly, by means of the corresponding set of arms 16. This enables eight bales or more to be carried by the device and increases the capacity of the device.

Although mention is made of four or eight bales, nevertheless it will be appreciated that the number of bales can be increased or decreased as desired depending upon design parameters.

Figure 10:
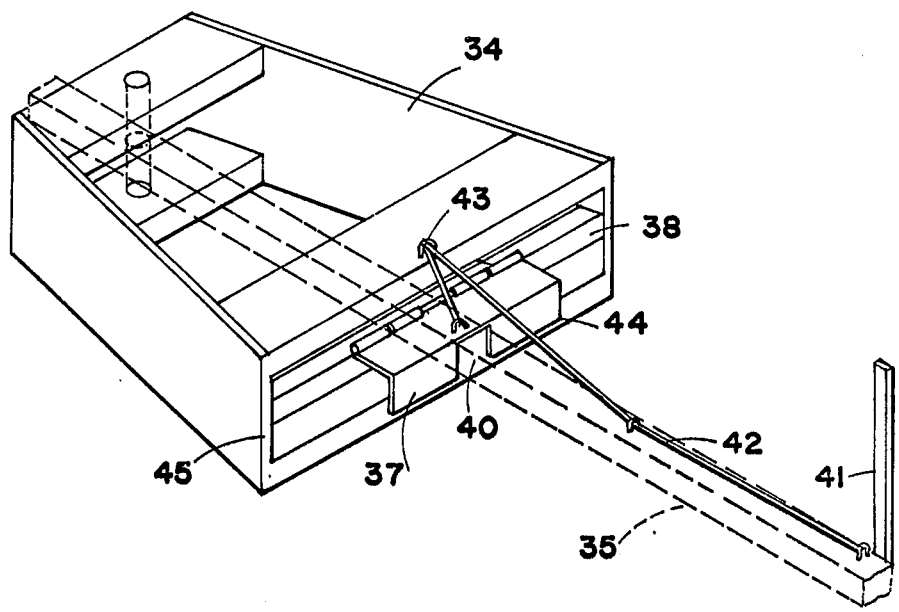
FIG. 10 is a fragmentary schematic isometric view showing the tongue locking mechanism for the embodiment shown in FIG. 8.
Figure 11:
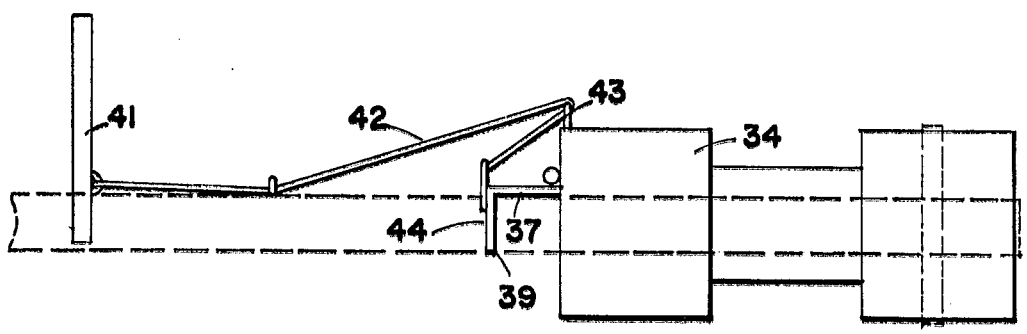
FIG. 11 is a side elevational view of FIG. 10.

Reference should next be made to FIGS. 10 and 11 which show the method of locking the hitch bar or tongue 35 in the desired position.

A short length of angle iron or the equivalent 37 is pivoted to a cross member 38 situated across the front of the yoke assembly 34 and the downwardly extending flange 39 is provided with a cut-out 40 as clearly shown in FIG. 10. The angle iron 37 is raised by means of lever 41 operating cable 42 over clevis 43 so that when it is in the raised position, the bar or tongue 35 can be moved from side to side to the two positions shown in FIG. 8 or can be centralized for straight ahead towing as shown in phantom in FIG. 10. When in the central position shown in FIG. 10, handle 41 is released so that the angle iron 37 returns to the position shown in FIG. 11 by gravity with the bar 35 being engaged by the cut-out portion 40 thus anchoring the bar or tongue in the central position.

When in either of the positions shown in FIG. 8, the bar or tongue 35 engages between either of the outer ends 44 of the angle iron 37 and either of the vertical frame members 45 of the yoke assembly 34, once again locking the tongue firmly in the desired position.

Figure 9:
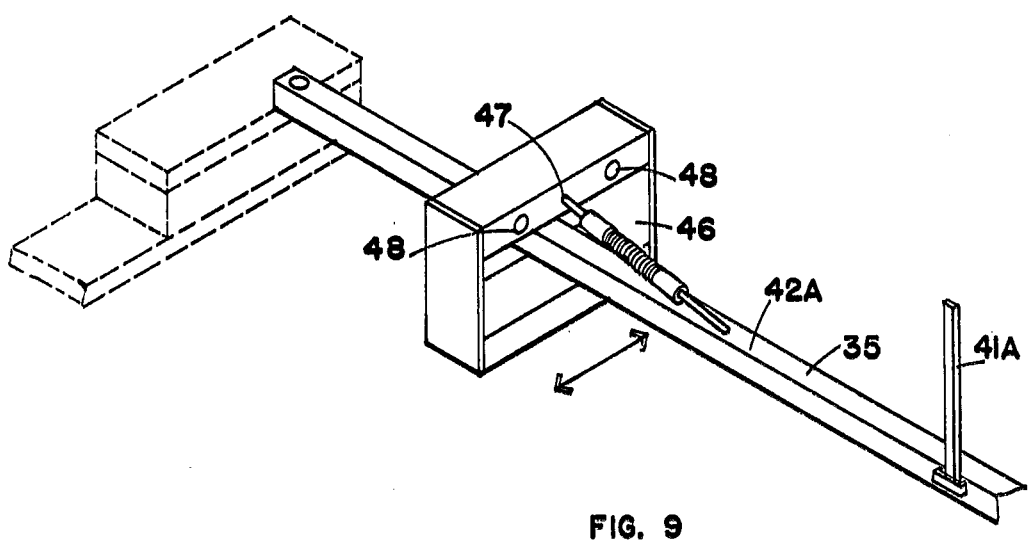
FIG. 9 is a fragmentary schematic isometric view showing the tongue locking mechanism for the hitch of FIG. 1.

In the embodiment illustrated in FIG. 1, it will be noted that the tongue 35 is angled to one side so that it can be pulled by a tractor, but once again it is desirable to move this to a position parallel with the chassis when the device is to be towed and FIG. 9 shows one method of locking the tongue in either of these two positions.

The tongue passes through a box frame component 46 mounted on the frame and a shot bolt 47 engages one or the other of the holes or apertures 48 drilled in the front member of this box frame 46. The shot bolt is spring loaded and operated by a lever 41A and a cable 42A.

Figure 12:
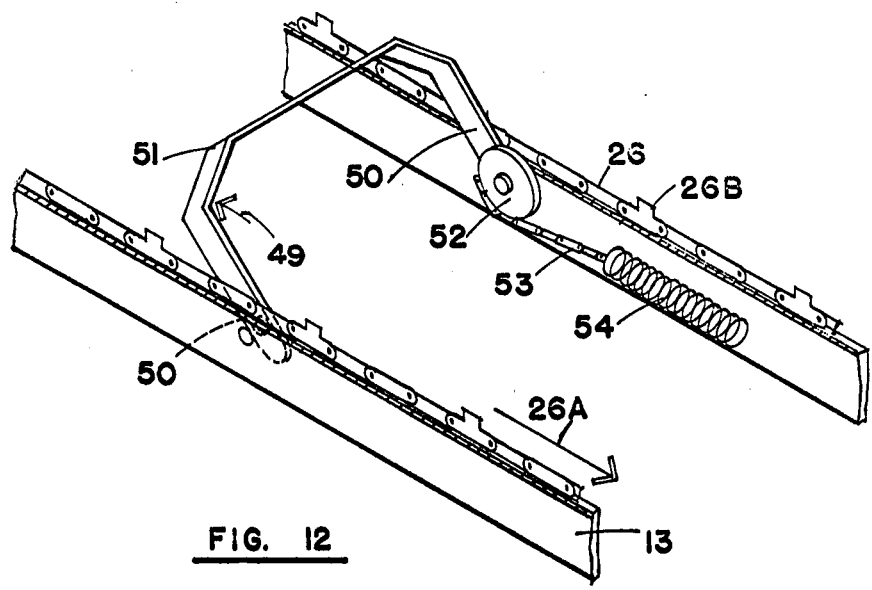
FIG. 12 is a fragmentary isometric schematic view showing a stop intermediate the ends of the upper runs of the chains to receive the first bale from the arms, said stop being shown in the "up" position.
Figure 13:
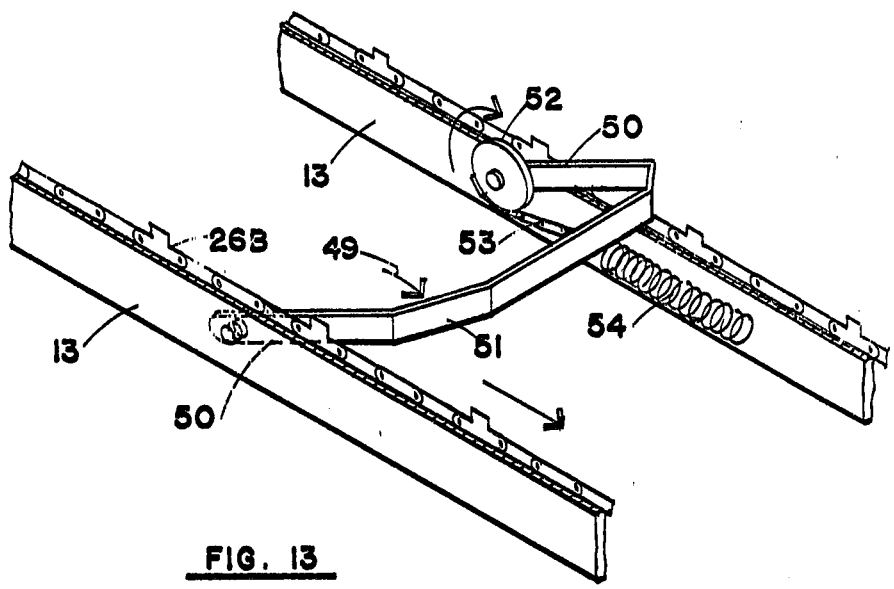
FIG. 13 is a view similar to FIG. 12, but showing the stop in the "down" position as the bale is moved rearwardly.

Finally, reference should be made to FIGS. 12 and 13 which show a further stop mechanism collectively designated 49 situated across the chassis between the main chains 26 and in a position just behind where the first bale will be deposited upon the chains 26. In this connection it should be noted that chains 26 are provided with a plurality of lugs 26B which assist in moving the bales rearwardly when the chains are actuated by means of the arms 16.

This stop mechanism includes a pair of mounting arms 50 and a cross member 51 extending between the upper ends of the mounting arms 50 and it will be noted that the cross member 51 is situated at right angles to the arms 50, and that the side parts of the cross member 51 incline downwardly and outwardly to the arms 50.

A sprocket or wheel 52 is secured to one of the arms 50 and moves therewith and a chain 53 is secured to the periphery of the sprocket by one end and by the other end to a tension spring 54 which in turn is anchored to the chassis member 13.

When the spring is in the closed position shown in FIG. 12, the arms 50 incline upwardly and forwardly so that as the first bale is deposited upon the chains, it engages the cross bar 51 which stops the bale from moving rearwardly. In this connection it should be understood that the bale is moving downwardly and rearwardly as it leaves the arms 16 and is deposited upon the chains 26.

However, when the chains 26 move in the direction of arrow 26A as hereinabove described, the bale is moving horizontally and will pivot the stop member 49 rearwardly to the position shown in FIG. 13 thus allowing the bale to roll over the stop member which then is returned to the original position by means of spring 54 in time to prevent undesirable rearward movement of the next bale independently of the movement of the chains 26.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A bale mover adapted to load, transport and unload large cylindrical bales of hay, straw and the like and adapted to be towed and operated by a source of power including a source of hydraulic fluid under pressure; said bale mover comprising in combination a substantially rectangular chassis, means mounting said chassis for movement across the ground, hitch means for connecting the associated source of power to the chassis, conveyor means operatively mounted upon said chassis, said conveyor means including an endless conveyor for moving the associated bales from the front of the chassis towards the rear thereof and a pair of arm components pivoted by one end thereof to the front end of the chassis, means on said arm components to detachably engage said components one into each end of an associated bale whereby said bale is clamped between said arms, means to raise said arm components through an arc thereby lifting the associated bale engaged by said arm components, through an arc and depositing said bale transversely upon said conveyor means adjacent the front end thereof, means operatively connected between said arm components and said conveyor means to move said conveyor means incrementally, together with any bales thereon, towards the rear of said chassis each time said arm components are actuated and stop means intermediate the ends of said conveyor means to initially retain the associated bale on the front end of said conveyor means until said conveyor means move rearwardly upon actuation of said arm components.

2. The bale mover according to claim 1 which includes selectively operable stop means at the rear of said chassis to selectively retain the rearmost bale on said conveyor means.

3. The bale mover according to claim 2 in which said conveyor means includes a pair of endless conveyor chains, means journalling said conveyor chains at each end thereof, said conveyor chains having an upper run and a lower run, and bale engaging means extending from said conveyor chains, means to support said upper runs for horizontal movement from the front of said chassis to the rear thereof, said last mentioned means including a longitudinally extending chain carrying chassis member for each of said conveyor chains, secured to said chassis.

4. The bale mover according to claim 3 in which each of said arm components includes a forwardly extending portion, a flipper plate pivoted to said forwardly extending portion, said flipper plate normally extending inwardly of said forwardly extending portion at right angles to same when said arm is in the lowermost position, and stop means co-operating between said flipper plate and said forwardly extending portion to limit the upward movement of said flipper plate, said flipper plate engaging with the ends of the associated bale when in the lowermost position and releasing the associated bale when said arm component passes over the vertical position when moving in an arc as aforesaid, a centrally located cross member hinged transversely to the front end of said chassis, each of said arm components including means selectively and adjustable engaging said arm components with said cross member for adjusting the distance between said arm components, and bale lifter assisting means depending downwardly from said cross member.

5. The bale mover according to claim 3 in which said means operatively connected between said arm components and said conveyor chains includes a length of sprocket chain secured by one end thereof to said arms, a shaft mounted across said chassis adjacent the front end thereof, a pair of sprockets secured to said shaft, said conveyor chains each extending around said further sprocket, spring means secured to the other end of said further length of chain and extending to said chassis for maintaining the tension within said chain, and stop clutch means associated with said further sprocket whereby movement of said arm components in the one direction moves said length of sprocket chain and thence partially rotates said shaft and moves the upper run of said conveyor chains rearwardly, said stop clutch means preventing forward movement of said upper runs of said conveyor chains when said arm components are moved in the opposite direction.

6. The bale mover according to claim 5 in which each of said arm components includes a forwardly extending portion, a flipper plate pivoted to said forwardly extending portion, said flipper plate normally extending inwardly of said forwardly extending portion at right angles to same when said arm is in the lowermost position, and stop means co-operating between said flipper plate and said forwardly extending portion to limit the upward movement of said flipper plate, said flipper plate engaging with the ends of the associated bale when in the lowermost position and releasing the associated bale when said arm component passes over the vertical position when moving in an arc as aforesaid, a centrally located cross member hinged transversely to the front end of said chassis, each of said arm components including means selectively and adjustable engaging said arm components with said cross member for adjusting the distance between said arm components, the bale lifter assisting means depending downwardly from said cross member.

7. The bale mover according to claim 2 in which each of said arm components includes a forwardly extending portion, a flipper plate pivoted to said forwardly extending portion, said flipper plate normally extending inwardly of said forwardly extending portion at right angles to same when said arm is in the lowermost position, and stop means co-operating between said flipper plate and said forwardly extending portion to limit the upward movement of said flipper plate, said flipper plate engaging with the ends of the associated bale when in the lowermost position and releasing the associated bale when said arm component passes over the vertical position when moving in an arc as aforesaid, a centrally located cross member hinged transversely to the front end of said chassis, each of said arm components including means selectively and adjustable engaging said arm components with said cross member for adjusting the distance between said arm components, and bale lifter assisting means depending downwardly from said cross member.

8. The bale mover according to claim 1 in which each of said arm components includes a forwardly extending portion, a flipper plate pivoted to said forwardly extending portion, said flipper plate normally extending inwardly of said forwardly extending portion at right angles to same when said arm is in the lowermost position, and stop means co-operating between said flipper plate and said forwardly extending portion to limit the upward movement of said flipper plate, said flipper plate engaging with the ends of the associated bale when in the lowermost position and releasing the associated bale when said arm component passes over the vertical position when moving in an arc as aforesaid, a centrally located cross member hinged transversely to the front end of said chassis, each of said arm components including means selectively and adjustable engaging said arm components with said cross member for adjusting the distance between said arm components, and bale lifter assisting means depending downwardly from said cross member.

9. The bale mover according to claim 1 in which said conveyor means includes a pair of endless conveyor chains, means journalling said conveyor chains at each end thereof, said conveyor chains having an upper run and a lower run, and bale engaging means extending from said conveyor chains, means to support said upper runs for horizontal movement from the front of said chassis to the rear thereof, said last mentioned means including a longitudinally extending chain carrying chassis member for each of said conveyor chains, secured to said chassis.

10. The bale mover according to claim 9 in which said means operatively connected between said arm components and said conveyor chains includes a length of sprocket chain secured by one end thereof to said arms, a shaft mounted across said chassis adjacent the front end thereof, a pair of sprockets secured to said shaft, said conveyor chains each extending around one of said sprockets, a further sprocket secured to said shaft, said length of sprocket chain extending around said further sprocket, spring means secured to the other end of said further length of chain and extending to said chassis for maintaining the tension within said chain, and stop clutch means associated with said further sprocket whereby movement of said arm components in the one direction moves said length of sprocket chain and thence partially rotates said shaft and moves the upper run of said conveyor chains rearwardly, said stop clutch means preventing forward movement of said upper runs of said conveyor chains when said arm components are moved in the opposite direction.

11. The bale mover according to claim 10 in which each of said arm components includes a forwardly extending portion, a flipper plate pivoted to said forwardly extending portion, said flipper plate normally extending inwardly of said forwardly extending portion at right angles to same when said arm is in the lowermost position, and stop means co-operating between said flipper plate and said forwardly extending portion to limit the upward movement of said flipper plate, said flipper plate engaging with the ends of the associated bale when in the lowermost position and releasing the associated bale when said arm component passes over the vertical position when moving in an arc as aforesaid, a centrally located cross member hinged transversely to the front end of said chassis, each of said arm components including means selectively and adjustable engaging said arm components with said cross member for adjusting the distance between said arm components, the bale lifter assisting means depending downwardly from said cross member.

12. The bale mover according to claim 9 in which each of said arm components includes a forwardly extending portion, a flipper plate pivoted to said forwardly extending portion, said flipper plate normally extending inwardly of said forwardly extending portion at right angles to same when said arm is in the lowermost position, and stop means co-operating between said flipper plate and said forwardly extending portion to limit the upward movement of said flipper plate, said flipper plate engaging with the ends of the associated bale when in the lowermost position and releasing the associated bale when said arm component passes over the vertical position when moving in an arc as aforesaid, a centrally located cross member hinged transversely to the front end of said chassis, each of said arm components including means selectively and adjustable engaging said arm components with said cross member for adjusting the distance between said arm components, and bale lifter assisting means depending downwardly from said cross member.

13. The bale mover according to claim 9 in which said hitch means includes a hitch bar extending forwardly from said chassis and means to detachably move and lock said hitch bar in any one of a plurality of positions, said positions including a position whereby the distal end of said hitch bar lies centrally of said chassis, a position where the distal end of said hitch bar lies upon one side of said chassis, and a position whereby the distal end of said hitch bar lies upon the opposite side of said chassis.

14. A bale mover adapted to load, transport and unload large cylindrical bales of hay, straw and the like and adapted to be towed and operated by a source of power including a source of hydraulic fluid under pressure; said bale mover comprising in combination a substantially rectangular chassis, means mounting said chassis for movement across the ground, hitch means for connecting the associated source of power to the chassis, conveyor means operatively mounted upon said chassis, said conveyor means including an endless conveyor for moving the associated bales from the front of the chassis towards the rear thereof and a pair of arm components pivoted by one end thereof to the front end of the chassis, means on said arm components to detachably engage said components one into each end of an associated bale whereby said bale is clamped between said arms, means to raise said arm components through an arc thereby lifting the associated bale engaged by said arm components, through an arc and depositing said bale transversely upon said conveyor means adjacent the front end thereof, means operatively connected between said arm components and said conveyor means to move said conveyor means incrementally, together with any bales thereon, towards the rear of said chassis each time said arm components are actuated, conveyor means including a pair of endless conveyor chains, means journalling said conveyor chains at each end thereof, said conveyor chains having an upper run and a lower run, and bale engaging means extending from said conveyor chains, means to support said upper runs for horizontal movement from the front of said chassis to the rear thereof, said last mentioned means including a longitudinally extending chain carrying chassis member for each of said conveyor chains, secured to said chassis, said means operatively connected between said arm components and said conveyor chains includes a length of sprocket chain secured by one end thereof to said arms, a shaft mounted across said chassis adjacent the front end thereof, a pair of sprockets secured to said shaft, said conveyor chains each extending around one of said sprockets, a further sprocket secured to said shaft, said length of sprocket chain extending around said further sprocket, spring means secured to the other end of said further length of chain and extending to said chassis for maintaining the tension within said chain, and stop clutch means associated with said further sprocket whereby movement of said arm components in the one direction moves said length of sprocket chain and thence partially rotates said shaft and moves the upper run of said conveyor chains rearwardly, said stop clutch means preventing forward movement of said upper runs of said conveyor chains when said arm components are moved in the opposite direction.

15. The bale mover according to claim 14 which includes selectively operable stop means at the rear of said chassis to selectively retain the rearmost bale on said conveyor means.

16. The bale mover according to claim 14 which includes stop means intermediate the ends of said conveyor means to initially retain the associated bale on the front end of said conveyor means until said conveyor means moves rearwardly upon actuation of said arm components.

17. The bale mover according to claim 14 in which each of said arm components includes a forwardly extending portion, a flipper plate pivoted to said forwardly extending portion, said flipper plate normally extending inwardly of said forwardly extending portion at right angles to same when said arm is in the lowermost position, and stop means co-operating between said flipper plate and said forwardly extending portion to limit the upward movement of said flipper plate, said flipper plate engaging with the ends of the associated bale when in the lowermost position and releasing the associated bale when said arm component passes over the vertical position when moving in an arc as aforesaid, a centrally located cross member hinged transversely to the front end of said chassis, each of said arm components including means selectively and adjustable engaging said arm components with said cross member for adjusting the distance between said arm components, the bale lifter assisting means depending downwardly from said cross member.

18. The bale mover according to claim 14 in which said hitch means includes a hitch bar extending forwardly from said chassis and means to detachably move and lock said hitch bar in any one of a plurality of positions, said positions including a position whereby the distal end of said hitch bar lies centrally of said chassis, a position where the distal end of said hitch bar lies upon one side of said chassis, and a position whereby the distal end of said hitch bar lies upon the opposite side of said chassis.

19. A bale mover adapted to load, transport and unload large cylindrical bales of hay, straw and the like and adapted to be towed and operated by a source of power including a source of hydraulic fluid under pressure; said bale mover comprising in combination a substantially rectangular chassis, means mounting said chassis for movement across the ground, hitch means for connecting the associated source of power to the chassis, conveyor means operatively mounted upon said chassis, said conveyor means including an endless conveyor for moving the associated bales from the front of the chassis towards the rear thereof and a pair of arm components pivoted by one end thereof to the front end of the chassis, means on said arm components to detachably engage said components one into each end of an associated bale whereby said bale is clamped between said arms, means to raise said arm components through an arc thereby lifting the associated bale engaged by said arm components, through an arc and depositing said bale transversely upon said conveyor meand adjacent the front end thereof, means operatively connected between said arm components and said conveyor means to move said conveyor means incrementally, together with any bales thereon, towards the rear of said chassis each time said arm components are actuated, each of said arm components including a forwardly extending portion, a flipper plate pivoted to said forwardly extending portion, said flipper plate normally extending inwardly of said forwardly extending portion at right angles to same when said arm is in the lowermost position, and stop means co-operating between said flipper plate and said forwardly extending portion to limit the upward movement of said flipper plate, said flipper plate engaging with the ends of the associated bale when in the lowermost position and releasing the associated bale when said arm component passes over the vertical position when moving in an arc as aforesaid, a centrally located cross member hinged transversely to the front end of said chassis, each of said arm components including means selectively and adjustable engaging said arm components with said cross member for adjusting the distance between said arm components, and bale lifter assisting means depending downwardly from said cross member.

20. The bale mover according to claim 19 which includes selectively operable stop means at the rear of said chassis to selectively retain the rearmost bale on said conveyor means.

21. The bale mover according to claim 19 which includes stop means intermediate the ends of said conveyor means to initially retain the associated bale on the front end of said conveyor means until said conveyor means moves rearwardly upon actuation of said arm components.

22. The bale mover according to claim 19 in which said conveyor means includes a pair of endless conveyor chains, means journalling said conveyor chains at each end thereof, said conveyor chains having an upper run and a lower run, and bale engaging means extending from said conveyor chains, means to support said upper runs for horizontal movement from the front of said chassis to the rear thereof, said last mentioned means including a longitudinally extending chain carrying chassis member for each of said conveyor chains, secured to said chassis.

23. The bale mover according to claim 22 in which said means operatively connected between said arm components and said conveyor chains includes a length of sprocket chain secured by one end thereof to said arms, a shaft mounted across said chassis adjacent the front end thereof, a pair of sprockets secured to said shaft, said conveyor chains each extending around one of said sprockets, a further sprocket secured to said shaft, said length of sprocket chain extending around said further sprocket, spring means secured to the other end of said further length of chain and extending to said chassis for maintaining the tension within said chain, and stop clutch means associated with said further sprocket whereby movement of said arm components in the one direction moves said length of sprocket chain and thence partially rotates said shaft and moves the upper run of said conveyor chains rearwardly, said stop clutch means preventing forward movement of said upper runs of said conveyor chains when said arm components are moved in the opposite direction.

24. The bale mover according to claim 23 in which said hitch means includes a hitch bar extending forwardly from said chassis and means to detachably move and lock said hitch bar in any one of a plurality of positions, said positions including a position whereby the distal end of said hitch bar lies centrally of said chassis, a position where the distal end of said hitch bar lies upon one side of said chassis, and a position whereby the distal end of said hitch bar lies upon the opposite side of said chassis.

25. The bale mover according to claim 22 in which said hitch means includes a hitch bar extending forwardly from said chassis and means to detachably move and lock said hitch bar in any one of a plurality of positions, said positions including a position whereby the distal end of said hitch bar lies centrally of said chassis, a position where the distal end of said hitch bar lies upon one side of said chassis, and a position whereby the distal end of said hitch bar lies upon the opposite side of said chassis.

* * * * *